United States Patent [19]
Carter et al.

[11] Patent Number: 5,829,861
[45] Date of Patent: Nov. 3, 1998

[54] ILLUMINATING INSTRUMENT PANEL WITH CONVEX COVER

[76] Inventors: James C. Carter, 7680 Allen Rd., Clarkston, Mich. 48348; Richard Megregian, 30000 Summitt Dr., Apt. 202, Farmington Hills, Mich. 48334; Eli Nichols, 12214 Cherrywood, Plymouth, Mich. 48170

[21] Appl. No.: 936,795
[22] Filed: Sep. 24, 1997
[51] Int. Cl.[6] .................................................. G01D 11/28
[52] U.S. Cl. ............................ 362/29; 362/30; 116/286; 116/288; 116/DIG. 36
[58] Field of Search ................................ 362/27, 29, 26, 362/28, 30; 116/288, DIG. 36, 62.1, 304, DIG. 39, 286

[56] References Cited

U.S. PATENT DOCUMENTS

| | | |
|---|---|---|
| D. 207,000 | 2/1967 | Castelet . |
| 2,167,463 | 7/1939 | Regester ..................................... 362/29 |
| 2,211,118 | 8/1940 | Hills .......................................... 362/29 |
| 3,490,226 | 1/1970 | Anderson et al. . |
| 4,241,388 | 12/1980 | Green . |
| 4,460,940 | 7/1984 | Mori . |
| 4,475,614 | 10/1984 | Takamatsu et al. . |
| 4,521,078 | 6/1985 | Baeger . |
| 4,895,455 | 1/1990 | Horning ..................................... 362/29 |
| 5,161,480 | 11/1992 | Furuya et al. . |
| 5,229,754 | 7/1993 | Aoki et al. . |
| 5,291,338 | 3/1994 | Bezard et al. . |
| 5,361,165 | 11/1994 | Stringellow et al. . |
| 5,398,134 | 3/1995 | Ikegaya . |
| 5,596,143 | 1/1997 | Hashimoto . |

FOREIGN PATENT DOCUMENTS

| | | |
|---|---|---|
| 59-6137 | 1/1984 | Japan . |
| 2152886 | 8/1985 | United Kingdom . |

OTHER PUBLICATIONS

Carter et al., Patent Application entitled "Illuminating Instrument Panel Gauge Using Light–Collimating" filed Sep. 24, 1997 (96–1848).

Carter et al., Patent Application entitled "Illuminating Instrument Panel Gauge with Indicator and Improved Graphics"; filed Sep. 24, 1997 (97–1815).

Carter et al., Patent Application entitled "Instrument Panel Having Cover With Reflection–Reduction Layer and Method of Making Cover" filed Sep. 24, 1997 (97–1817).

*Primary Examiner*—Thomas M. Sember

[57] ABSTRACT

An instrument panel has a front side for facing toward a driver and a back side for facing away from the driver, a light source, a subdial surface in front of the light source, and a transparent cover in front of and spaced away from the subdial surface. The transparent cover is substantially (preferably, at least 50%) rounded outwardly toward the driver. The instrument panel may include graphics on or in the cover. Due to the curvature of the cover, the graphics may have an outermost portion which is closest to the driver and an innermost portion which is further from the driver. Preferably, the outermost portion of the graphics is narrower relative to the innermost portion so that the graphics appear to be in a plane parallel with the driver. There may be at least three horizontally-spaced transparent covers on one instrument panel, wherein at least one of the covers is an inboard cover and at least two covers are outboard covers, one outboard cover on one side of the inboard cover and the other outboard cover being on the other side of the inboard cover. The outboard covers may be positioned inwardly toward the driver relative to the inboard cover.

3 Claims, 3 Drawing Sheets

ILLUMINATING INSTRUMENT PANEL WITH CONVEX COVER

BACKGROUND OF THE INVENTION

1. Field of the Invention

The present invention relates generally to illuminating instrument panels and, more particularly, to illuminating instrument panels with improved readability.

2. Description of the Related Art

Illuminating instrument panels for automobiles, usually placed in the dash of the automobile, are used to show the status of various operations of the automobile. A typical illuminating instrument panel has a front side for positioning toward the driver, a back side for positioning away from the driver, a light source at the back side of the panel for illuminating the panel, an overlay in front of the light source which allows some light to pass through and illuminate the panel, and a transparent cover in front of and spaced away from the overlay. Most often an illuminating instrument panel includes a movable dial or indicator in front of the overlay and corresponding graphics printed on the overlay. Such instrument panels include speedometers, gas gauges, engine temperature gauges, and tachometers.

In addition to the above, the typical illuminating instrument panel includes a light-impervious brow extending over the front of the transparent cover for reducing the amount of reflections from the instrument panel directed toward the driver. For example, ambient light (e.g., from the sun), hits the brow and is absorbed rather than hitting the transparent cover and reflecting back into the driver's eyes, impairing the driver's vision.

The light-impervious brow is also present to reduce the amount of reflectance caused by light-colored objects inside the passenger compartment of the automobile. For example, without a brow, light from light-colored clothing would usually be reflected by the transparent cover. This occurrence is often referred to as the "white shirt syndrome". Currently, the cover of the instrument panel is designed so that much of the reflection from the clothing is projected toward the brow and not seen by the driver.

Brows, however, are cumbersome in design, require a substantial amount of material to construct and add weight to the automobile. It would, therefore, be desirable to control the instrument panel reflections without a brow to provide more automobile design flexibility (both functionally and aesthetically) and to save on material cost and weight of the automobile.

It is, therefore, one object of the present invention to provide an illuminating instrument panel which has a reduced level of reflections on the cover as seen by a driver and, thus, is more readable than prior art instrument panels.

It is another object of the present invention to provide an illuminating instrument panel which presents more design flexibility than previous illuminating instrument panels.

It is yet another object of the present invention to provide an illuminating instrument panel which does not require a brow.

SUMMARY OF THE INVENTION

To achieve the foregoing objects, one embodiment of the present invention is an illuminating instrument panel for an automobile. The instrument panel has a front side for facing toward a driver and a back side for facing away from the driver, a light source, a subdial surface in front of the light source, and a transparent cover in front of and spaced away from the subdial surface. The transparent cover is substantially (preferably, at least 50%) rounded outwardly toward the driver.

The instrument panel may include graphics on or in the cover. Due to the curvature of the cover, the graphics would have an outermost portion which is closest to the driver and an innermost portion which is further from the driver. Preferably, the outermost portion of the graphics is narrower relative to the innermost portion so that the graphics appear to be in a plane parallel with the driver.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
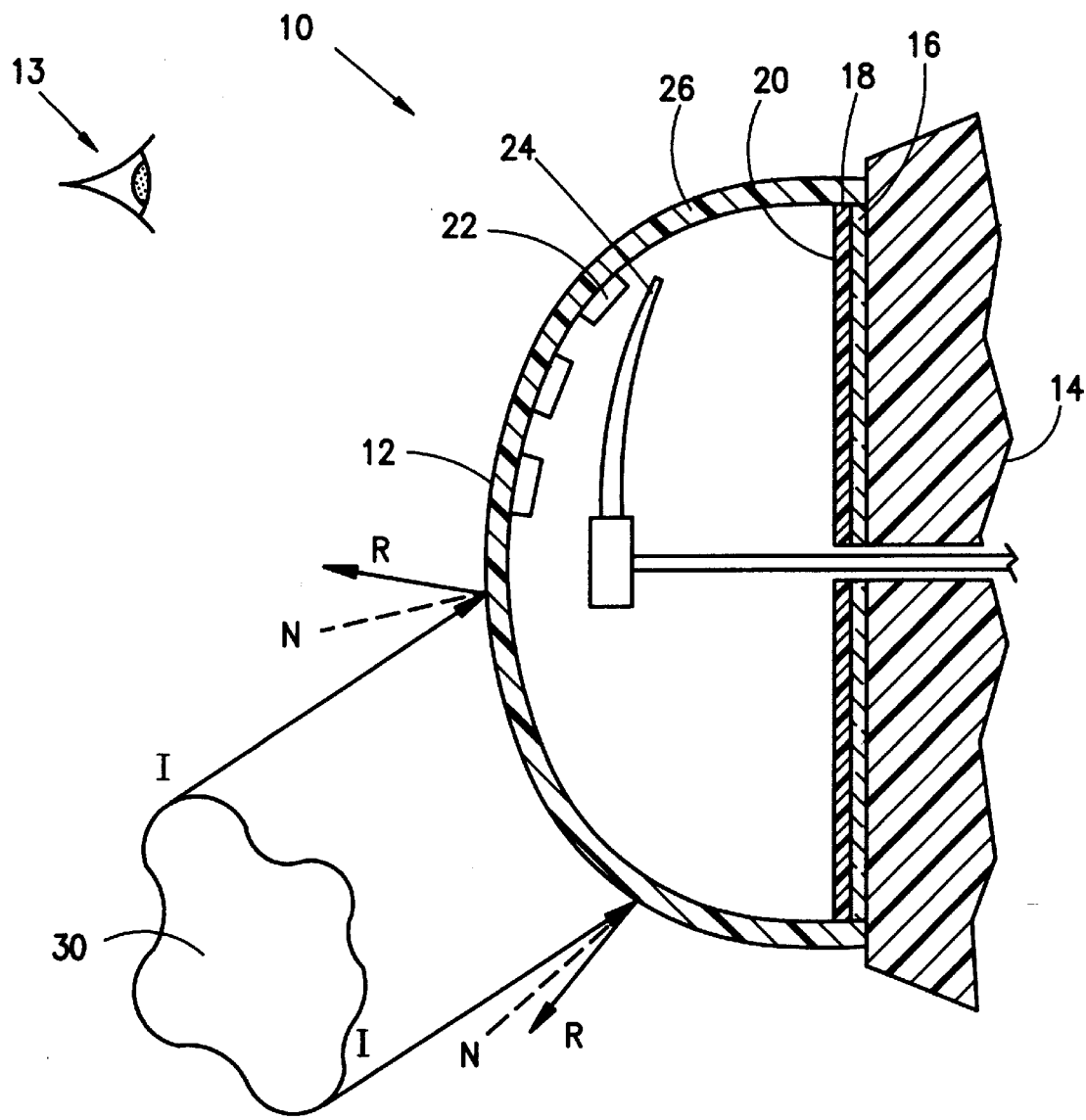
FIG. 1 is a side cross sectional view of an instrument panel according to the present invention.

One embodiment of the present invention is illustrated in FIG. 1 as illuminating instrument panel 10. Instrument panel 10 has front side 12 for facing toward driver 13 (represented by an eye), back side 14 for facing away from driver 13, light source 16 near back side 14, overlay 18 in front of light source 16, subdial surface 20 on the front side of overlay 18, movable indicator 24 in front of subdial surface 20, transparent cover 26 in front of and spaced away from subdial surface 20, and graphics 22 on cover 26.

Cover 26, which may be formed of injection-molded, transparent, clear resin, such as acrylic resin, is substantially rounded outwardly or convex toward driver 13. The term "substantially rounded outwardly" is used to mean that at least 50% of the cover is rounded outwardly. For example, the cover may be horizontally flat at the top and the bottom and rounded at the front, so long as at least 50% of the cover is rounded outwardly. Preferably, at least about 75% of the cover is rounded outwardly, and, more preferably at least about 90% of the cover is rounded outwardly. Although the term "rounded" is generally understood, a definition of rounded as used herein preferably means that the tangent line of any point on the front side of the rounded portion of the cover remains on the outside of the front side.

Figure 2:
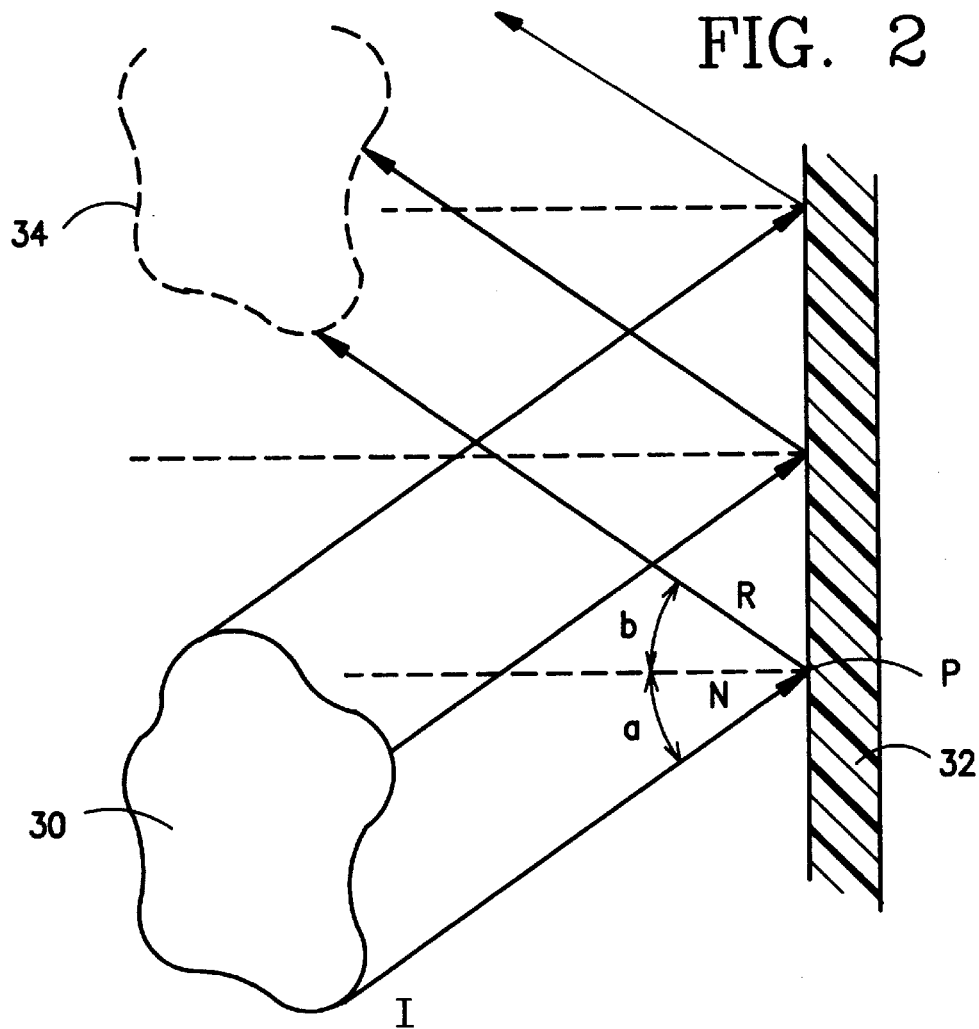
FIG. 2 is an illustration of an object reflecting from a flat cover of an instrument panel.

The roundedness of cover 26 disperses any reflections from, e.g., the sun or light objects in the automobile, so that reflected images are not as apparent to the driver. We refer next to FIG. 2 which helps to illustrate how the curvature of cover 26 disperses reflected light relative to flat covers. FIG. 2 shows light-colored object 30 and its reflection relationship to flat cover 32. Light-colored object 30 projects incident rays "I" toward cover 32 and hits cover 32 at points of incident "P". The angle between each incident ray "I" and the normal "N" of the surface at the corresponding point "P" is called an angle of incidence "a". The reflected ray "R" from each incident ray "I" is directed at angle "b" relative to the normal "N", and angle "b" is equal to angle "a".

Reflected rays "R" are parallel, and, therefore, project a reflected image 34 similar to light-colored object 30. Reflected image 34 is seen by the driver and disturbs the reading of the instrument panel.

In contrast, as illustrated in FIG. 1, light-colored object 30 has a dispersed reflection from rounded cover 26. Incident rays "I" hit cover 26 and cause reflected rays "R" which are directed in different directions (not parallel) and therefore do not form a sharp reflected image as does flat cover 32 of FIG. 2.

The rounded cover of the present invention may, e.g., have a cross section which has the curvature of a segment of a circle or an ellipse. Preferably, the cross section along the center line of the rounded portion of the cover includes at least about ⅛ of the perimeter of a circle or an ellipse.

Figure 3:
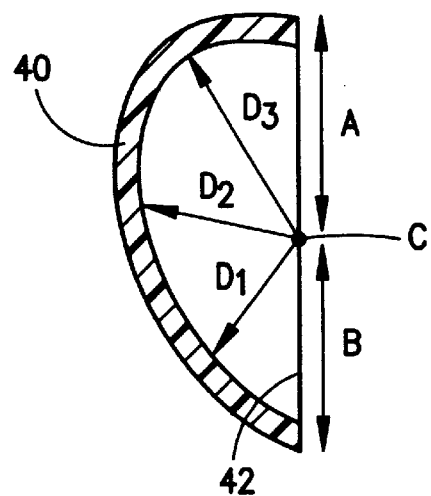
FIG. 3 is a cross sectional view of an instrument panel cover according to the present invention.

In addition, the cross section of the rounded cover may be asymmetrical. For example, cover 40 shown in FIG. 3 (which may be, e.g., a side cross sectional view or a top cross sectional view of cover 40) has a cross section which has varying distances from center point "C" on subdial surface 42 to the cover. Center point "C" is the center most point on subdial surface 42 as measured from one end of the cover to the other end. In other words, distance "A" from one end of subdial surface 42 to center point "C" equals distance "B" from the other end of subdial surface 42 to center point "C". The varying distances from center point "C" to cover 40 are referenced $D_1$, $D_2$, and $D_3$.

The light source of the instrument panel of the present invention may be any conventional light source, such as an incandescent lamp, a fluorescent lamp, a vacuum fluorescent lamp, an electroluminescent lamp, light emitting diodes, and liquid crystal displays. Incandescent lamps are the preferred and most-commonly used light source.

The overlay of the instrument panel hides the light source from the driver yet allows light from the light source to illuminate the instrument panel. The overlay may be translucent in that light may pass through it or it may be designed so that light passes around at least a portion of the periphery of the overlay or only through open or cut-away sections in the overlay. The overlay may optionally include cut-away sections to allow meters, such as an odometer, to be seen by the driver.

The overlay may be a film or coating, such as paint or a metallic coating, placed on the light source or it may be sheeting placed in front of the light source, such as colored plastic sheeting. The overlay is commonly formed of "MYLAR", a polyethylene terephthalate available from E. I. du Pont de Nemours & Co., Inc., Wilmington, Del.

The movable indicator of an instrument panel of the present invention is typically pivoting and controlled by the electronic system of the automobile. The movable indicator itself may also be illuminating.

The graphics on the cover may be applied by any of many methods. For example, the graphics may be hot-stamped, printed via silk-screening techniques, embossed, or appliqued onto the cover using adhesive. Optionally, the graphics may be inmolded into the interior of the cover rather than being on the surface of the cover as shown in FIG. 1.

Figure 4:
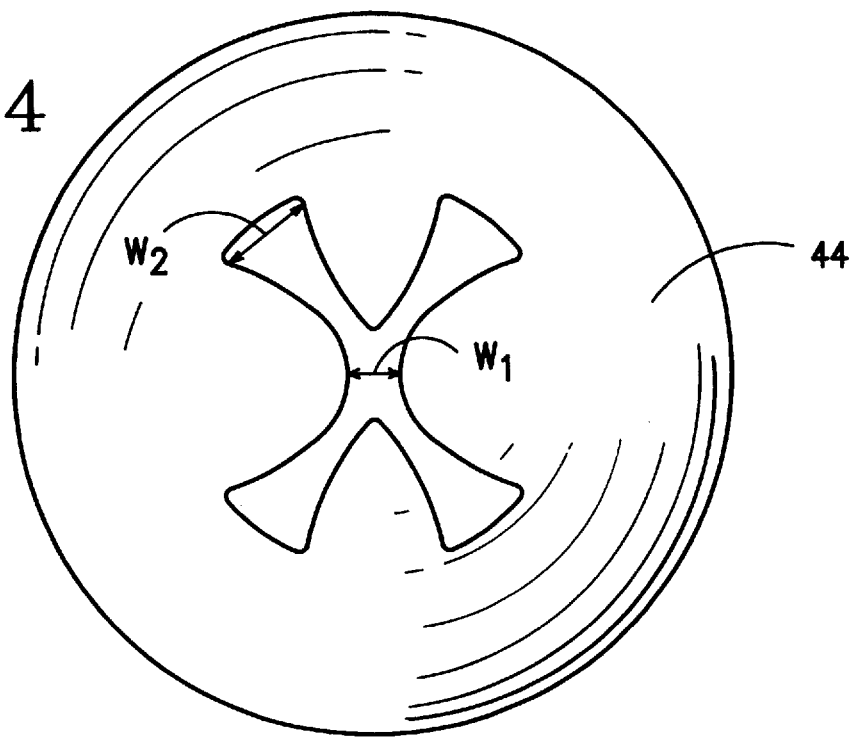
FIG. 4 is a front view of an instrument panel cover useful in the present invention.

Preferably, the shape of the graphics are adjusted with respect to the curvature of the cover so that the graphics appear to be in a plane parallel with the driver. For example, the portion of the graphics that is outermost or closest to the driver is preferably narrower relative to the portions of the graphics which are further from the driver. FIG. 4 shows an "X" on rounded cover 44 which is narrower at $W_1$, at the outermost portion than it is at $W_2$, at the innermost portion.

Figure 5:
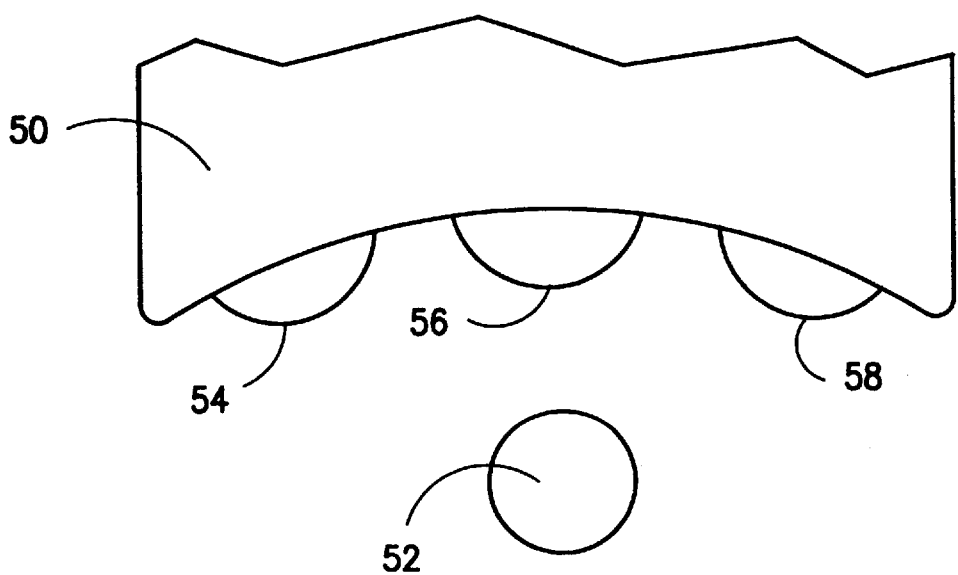
FIG. 5 is a top view of an instrument panel according to the present invention.

Another embodiment of the present invention is illustrated in FIG. 5 which shows a top view of instrument panel 50 in relative position with driver 52. Instrument panel 50 includes a plurality of transparent covers, specifically, three horizontally-spaced covers including interior or inboard cover 56, and exterior or outboard covers 54 and 58, wherein an outboard cover is on each side of inboard cover 56. Each instrument panel cover 54, 56, and 58 is rounded outwardly toward driver 52. Outboard covers 54 and 58 are positioned inwardly toward driver 52 relative to inboard cover 56.

The specific curvature and arrangement of the cover or covers may be designed to suit each model of automobile. The aspects to be considered for designing each instrument panel include the direction of the light rays from the sun, street lights, or head lights, etc., entering the windshield, side windows, and rear windows and striking the instrument panel. Knowing the angles of incident on a curved surface, one can calculate the angles of reflection, as discussed above, and design the cover(s) to reduce the reflected images seen by the driver.

Accordingly, the illuminating instrument panel of the present invention presents a reduced level of reflections on the cover as seen by a driver and, thus, is more readable than prior art instrument panels. In addition, the instrument panel of the present invention has more design flexibility than previous illuminating instrument panels in that it does not require a brow.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An instrument panel for an automobile, the instrument panel having a front side for facing toward a driver and a back side for facing away from the driver, the instrument panel comprising:

a light source;

a subdial surface in front of the light source;

a transparent cover in front of and spaced away from the subdial surface, the transparent cover being substantially rounded outwardly toward the driver; and at least three horizontally-spaced transparent covers, at least one of the covers being an inboard cover and at least two covers being outboard covers, one outboard cover on one side of the inboard cover and the other outboard cover being on the other side of the inboard cover, the outboard covers being positioned inwardly toward the driver relative to the inboard cover.

2. An instrument panel for an automobile, the instrument panel having a front side for facing toward a driver and a back side for facing away from the driver, the instrument panel comprising:

a light source;

a subdial surface in front of the light source;

a transparent cover in front of and spaced away from the subdial surface, the transparent cover being substantially rounded outwardly toward the driver; and graphics on the cover, the graphics having an outermost portion which is closest to the driver and an innermost portion which is further from the driver due to the curvature of the cover, the outermost portion being narrower relative to the innermost portion so that the graphics appear to be in a plane parallel with the driver.

3. An illuminating instrument panel for an automobile, the instrument panel having a front side for facing toward a driver and a back side for facing away from the driver, the instrument panel comprising:

a light source;

a subdial surface in front of the light source;

a transparent cover in front of and spaced away from the subdial surface, at least 50% of the transparent cover being substantially rounded outwardly toward the driver; and graphics on the cover, the graphics having an outermost portion which is closest to the driver and an innermost portion which is further from the driver due to the curvature of the cover, the outermost portion being narrower relative to the innermost portion so that the graphics appear to be in a plane parallel with the driver.

\* \* \* \* \*